United States Patent
Liu et al.

(10) Patent No.: US 10,301,538 B2
(45) Date of Patent: May 28, 2019

(54) PHOSPHOR COMPOSITION AND LIGHT EMITTING DEVICE USING THE SAME

(71) Applicant: Chung Yuan Christian University, Taoyuan (TW)

(72) Inventors: Wei-Jen Liu, Taoyuan (TW); Kuei-Ting Hsu, Taoyuan (TW); Pin-Chun Lin, Zhubei (TW); Ming-Hsiu Shiu, New Taipei (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 276 days.

(21) Appl. No.: 15/365,291

(22) Filed: Nov. 30, 2016

(65) Prior Publication Data

US 2017/0298271 A1  Oct. 19, 2017

(30) Foreign Application Priority Data

Apr. 14, 2016 (TW) .............................. 105111633 A (51) Int. Cl.
C09K 11/06 (2006.01)
C09K 11/08 (2006.01)

(52) U.S. Cl.
CPC .............. *C09K 11/06* (2013.01); *C09K 11/08* (2013.01); *C09K 2211/00* (2013.01)

(58) Field of Classification Search
CPC ...... C09K 11/06; C09K 11/08; C09K 2211/00
See application file for complete search history.

(56) References Cited

FOREIGN PATENT DOCUMENTS

JP 2004-91385 * 3/2004

* cited by examiner

*Primary Examiner* — C Melissa Koslow
(74) *Attorney, Agent, or Firm* — Muncy, Geissler, Olds & Lowe, P.C.

(57) ABSTRACT

The present invention provides a phosphor composition and light emitting device using the same. The phosphor composition includes a first phosphor and a second phosphor, the second phosphor includes *Phellodendron* extract, *Phellodendron* extract emits lights with wavelength from 450 nm to 750 nm as it is excited by lights with wavelength from 300 nm to 480 nm. The LED device using the phosphor composition could emit warm white lights with wavelength from 400 nm to 800 nm.

11 Claims, 9 Drawing Sheets

PHOSPHOR COMPOSITION AND LIGHT EMITTING DEVICE USING THE SAME

CROSS-REFERENCE TO RELATED APPLICATION

This application claims the benefits of priority to Taiwan Patent Application No. 105111633, filed on Apr. 14, 2016, which is hereby incorporated by reference herein in its entirety.

FIELD OF THE INVENTION

The present invention relates to a phosphor composition, particularly relates to a phosphor composition that includes Chinese medicine extract and is used as like-red phosphor and a white light LED device that uses the phosphor composition.

BACKGROUND OF THE INVENTION

The earliest light emitting diode was launched in 1965 and emitted red light. The earliest LED used Gallium Arsenide (GaAs) as a base material, which had luminous efficiency (luminous flux) of only 0.1 lumen per watt.

Phosphor used as a spectrum conversion has been broadly applied to LED since 1968. In 1996, Japan Nichia announced cerium-doped yttrium aluminum garnet (YAG:Ce) was excited by blue light LED to emit yellow light and is further combined with blue light to form cold white light.

With the improvements on package technology and luminous efficiency of LED, LED of compact volume, low current consumption, long life and rapid reaction to operation has come out, too.

Furthermore, owing to the requirement of carbon reduction and the raising awareness of environment protection, LED has been step-by-step replacing traditional incandescent light bulb and mercury lamp in many countries of the world. Now LED has applied broadly to signal light, advertisement light, vehicle light source, outdoor lighting or home lighting, display or backlight light source for computer peripheral devices.

Phosphor demand has been increased with the population of LED, the demand for rare earth metals such as Yttrium and Europium for phosphor has been increased in a rapid speed. Nowadays, the global rare earth metals are distributed in China (30.86%), the United States (14.88%), Australia (5.99%), the Independence States (21.67%), India (1.30%), Brazil (0.10%), Malaysia (0.03%) and other domains (25.17%).

Owing to the raising awareness of environment protection and high mining cost, the United States stopped extracting the rare earth metals since 1980. Now China that owns the 97% of the global rare earth metals yield is the biggest supplier of the rare earth metals. Though the rare earth metals are not deficient currently, however, their supplying chains are shrunk because China restricts its output of the rare earth metals. As a result, it is necessary to recycle the used rare earth metals in markets for efficiently stabilizing the raising prices of the rare earth metals.

So far, phosphor can be manufactured by solid state diffusion method, hydrothermal method or sol-gel method. Very high reaction temperature is necessary for the solid state diffusion method and the hydrothermal method. The sol-gel method is not suitable for mass production because it needs metal alkoxides of high prices and long time for manufacturing.

Accordingly, it is an issue of the present invention to form a kind of phosphor composition that is easy to be prepared and has low consumption on the rare earth composition.

SUMMARY OF THE INVENTION

The present invention provides a phosphor composition that is easy to be prepared and reduces energy consumption and consumption of rare earth metals.

Furthermore, the present invention provides a LED device including the phosphor composition so that the LED device may emits warm white light with wavelength from 400 nm to 800 nm.

Accordingly, a phosphor composition includes: a first phosphor; and a second phosphor including a *Phellodendron* extract.

In one preferred example, a weight ratio of the first phosphor and the second phosphor is between 4:1 and 32:1.

In one preferred example, the weight ratio of the first phosphor and the second phosphor is 10:1.

In one preferred example, the phosphor composition emits lights with wavelength from 400 nm to 800 nm.

In one preferred example, the *Phellodendron* extract is excited by lights with wavelength from 300 nm to 480 nm.

In one preferred example, the *Phellodendron* emits lights with wavelength from 450 nm to 750 nm.

In one preferred example, the first phosphor is selected from the group consisting of a yellow phosphor, a red phosphor, and a green phosphor.

In one preferred example, the yellow phosphor is selected from the group consisting of $Y_3Al_5O_{12}:Ce^{3+}$(YAG), $Tb_3Al_5O_{12}:Ce^{3+}$(TAG) and $(Mg, Ca, Sr, Ba)_2SiO_4:Eu^{2+}$.

In one preferred example, the red phosphor is selected from the group consisting of $(Sr, Ca)S:Eu^{2+}$, $(Y, La, Gd, Lu)_2O_3:Eu^{3+}, Bi^{3+}$; $(Y, La, Gd, Lu)_2O_2S:Eu^{3+}, Bi^{3+}$; $(Ca, Sr, Ba)_2Si_5N_8:Eu^{2+}$, $(Ca, Sr)AlSiN_3:Eu^{2+}$, $Sr_3SiO_5:Eu^{2+}$, $Ba_3MgSi_2O_8:Eu^{2+}, Mn^{2+}$ and $ZnCdS:Ag^{1+}, Cl^{1-}$.

In one preferred example, the green phosphor is selected from the group consisting of $BaMgAl_{10}O_{17}:Eu^{2+}, Mn^{2+}$ (BAM-Mn), $SrGa_2S_4:Eu^{2+}$, $Lu_3Al_5O_{12}:Ce^{3+}$(LuAG), $(Ca, Sr, Ba)Al_2O_4:Eu^{2+}$, $SrSi_2N_2O_2:Eu^{2+}$, $CaSc_2O_4:Ce^{3+}$, $Ca_3Sc_2Si_3O_{12}:Ce^{3+}$, $(Ca, Sr, Ba)_4Al_{14}O_{25}:Eu^{2+}$, $Ca_8Mg(SiO_4)_4Cl_2:Eu^{2+}, Mn^{2+}$, and $(Ba, Sr)_2SiO_4:Eu^{2+}$.

Accordingly, the present invention further provides light emitting device including the phosphor composition aforementioned.

DETAILED DESCRIPTION OF THE PREFERRED EMBODIMENT

The present invention provides *Phellodendron* extract for the replacement material of red phosphor and a LED package including the *Phellodendron* extract that performs chroma similar to the ones including commercial red phosphor.

Figure 1:
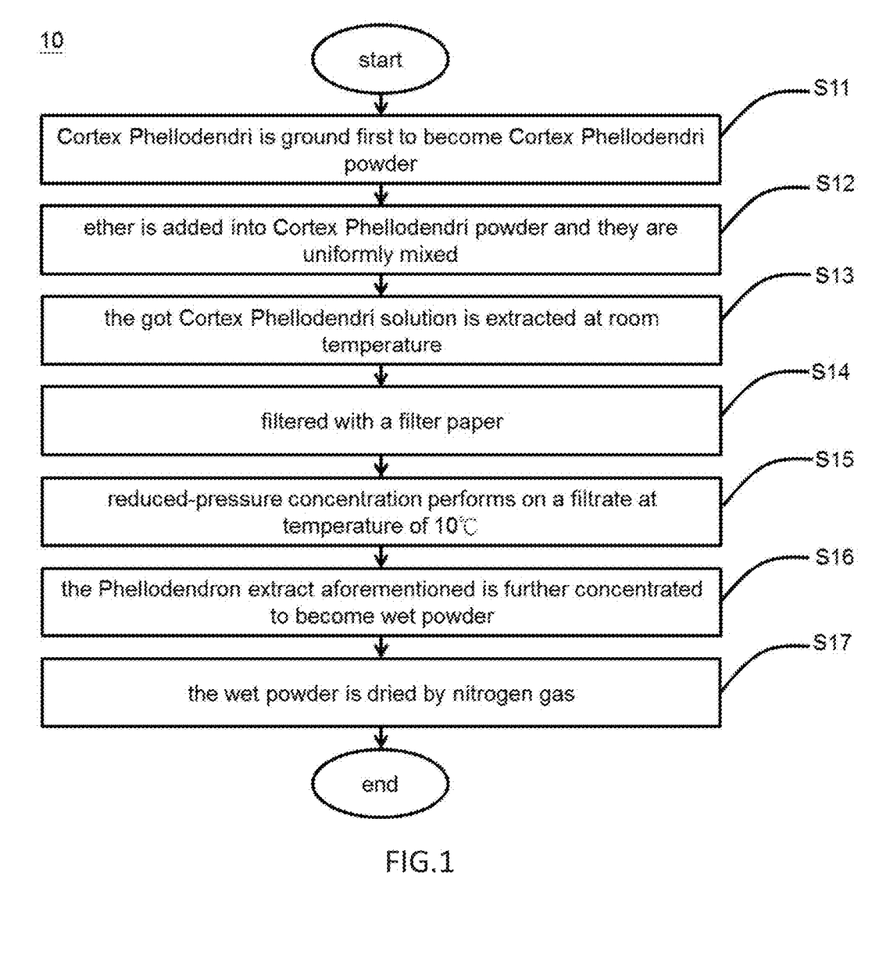
FIG. 1 is a schematically flowing diagram illustrating manufacture of *Phellodendron* extract according to the present invention.

Please refer to FIG. 1, No. 10 is a flow chart illustrating a method of manufacturing *Phellodendron* extract of the present invention. The Cortex Phellodendri used in the present invention may be acquired from rutaceau, such as *Phellodendron* of *Phellodendron chinense* Schneid or Amur Cork-tree Bark of *Phellodendron amurense* Rupr, and so on, but not limited to Cortex Phellodendri. Cortex Phellodendri is ground first to become Cortex Phellodendri powder (step S11). Next, ether is added into Cortex Phellodendri powder and they are uniformly mixed (step S12) to get Cortex Phellodendri solution.

Next, the got Cortex Phellodendri solution is extracted at room temperature (step S13) and filtered with a filter paper (step S14). After filtering (step S14), reduced-pressure concentration performs on a filtrate at temperature of 10° C. (step S15). As a result, *Phellodendron* extract that can be preserved for a long time is got after step S15.

Next, the *Phellodendron* extract aforementioned is further concentrated to become wet powder (step S16) and then the wet powder is dried by nitrogen gas (step S17) to get dried *Phellodendron* extract powder that may be used for LED package.

Figure 2:
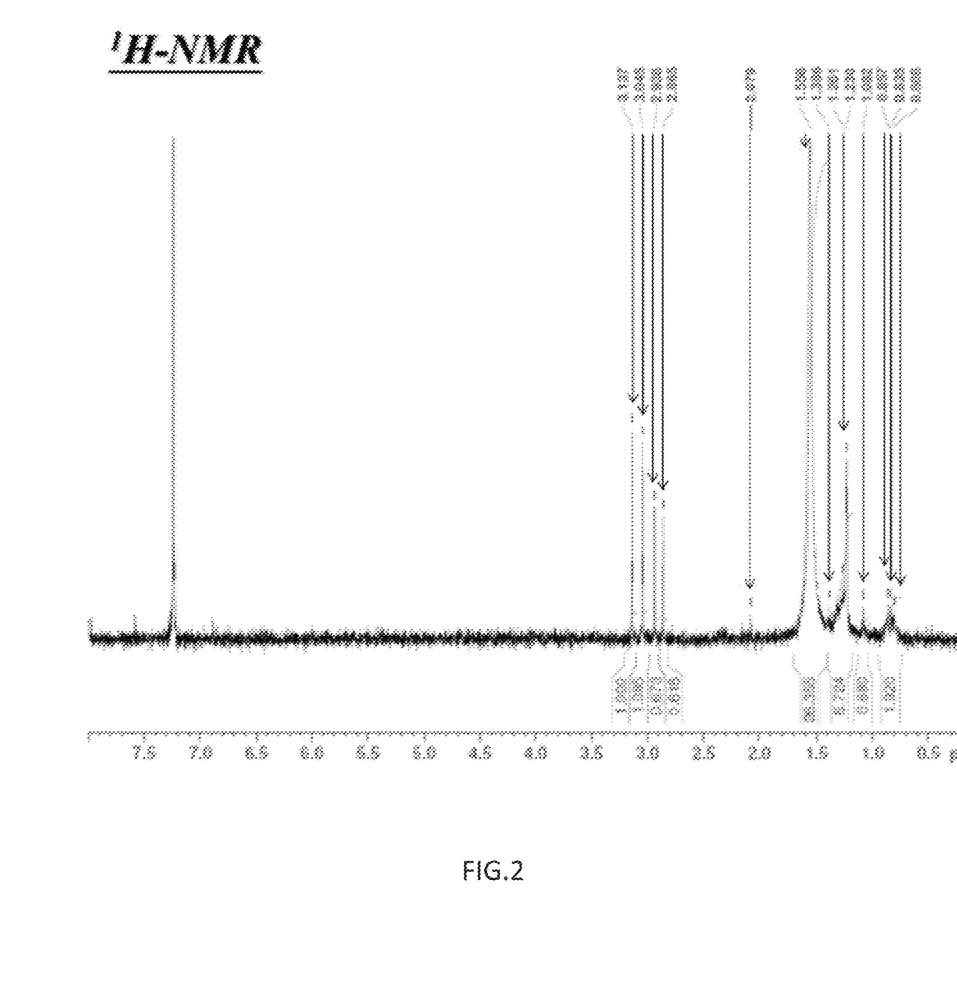
FIG. 2 is an NMR diagram illustrating *Phellodendron* extract according to the present invention.

FIG. 2 is an NMR diagram illustrating *Phellodendron* extract according to the present invention.

Figure 3:
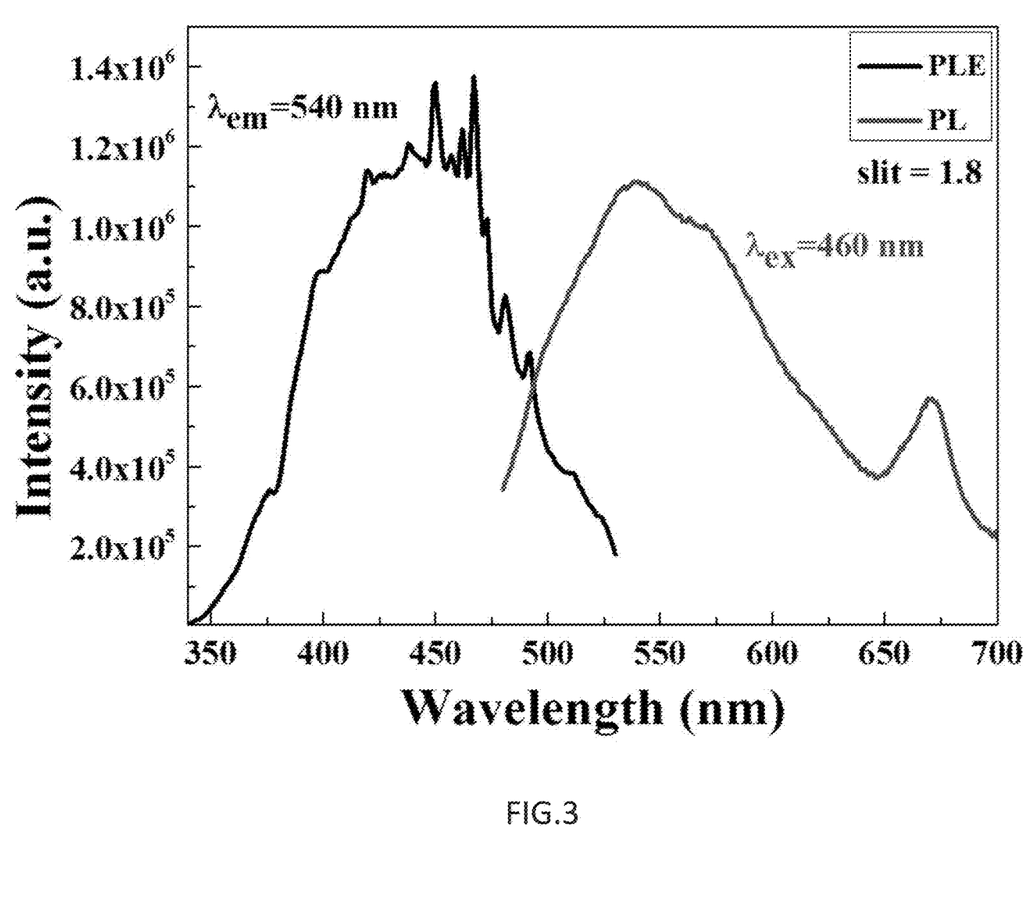
FIG. 3 is a spectrogram illustrating *Phellodendron* extract being excited and extracting according to the present invention.

FIG. 3 is a photoluminescence (PLE) and photoluminescence (PL) of spectrogram for the *Phellodendron* extract according to the present invention. Shown in FIG. 3, the *Phellodendron* extract mentioned in the present invention is excited by lights with wavelength from 300 nm to 480 nm. Accordingly, lights of wavebands from ultra violet (UV) to blue light may be used as an exciting light source. The excited *Phellodendron* extract emits lights with wavelength from 450 nm to 750 nm and may be used as replacement material of red phosphor.

Figure 4:
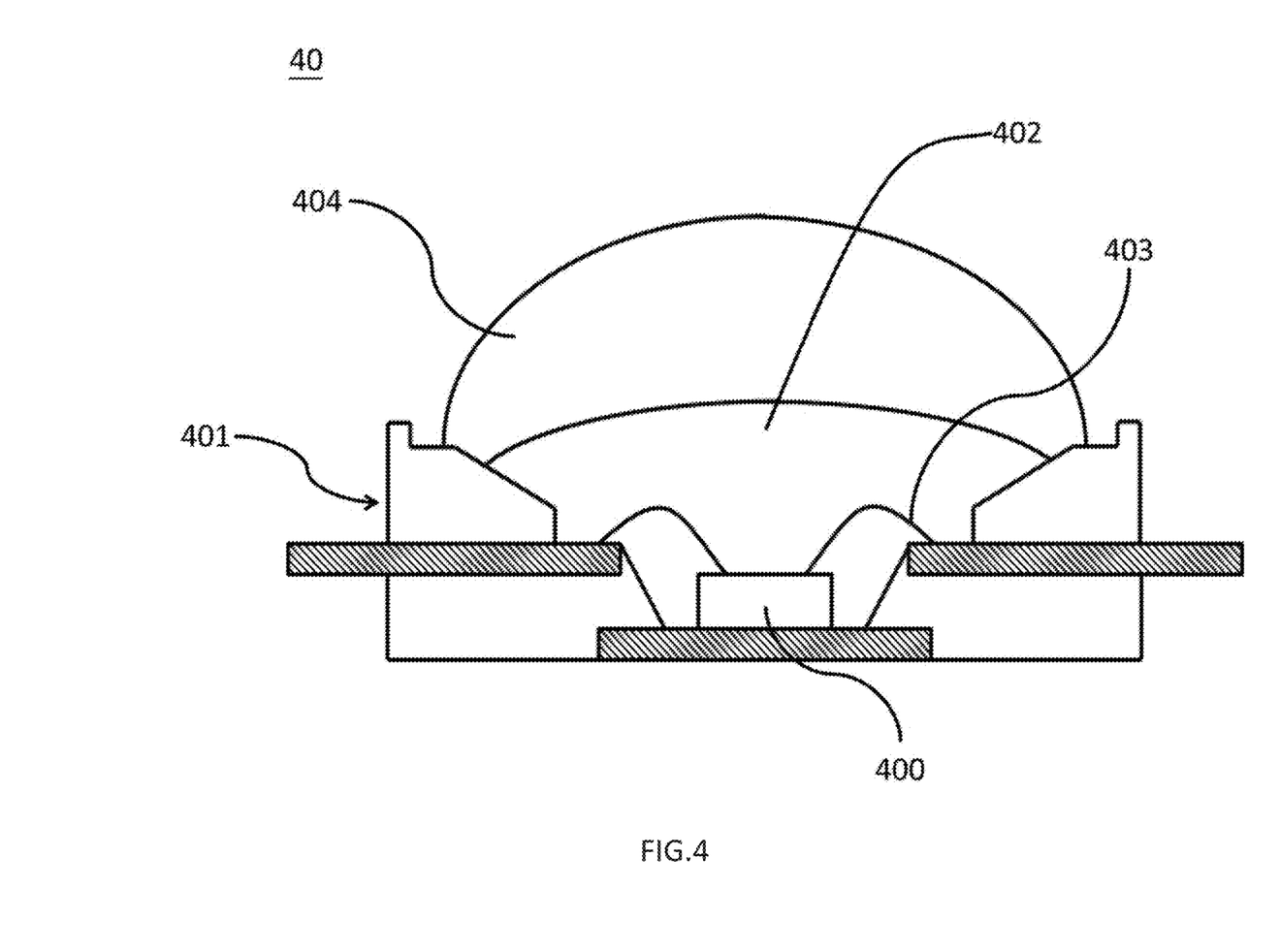
FIG. 4 is a schematic crossing-sectional diagram illustrating a LED device using the phosphor composition with *Phellodendron* extract according to the present invention.

FIG. 4 is a crossing-sectional diagram illustrating a LED device 40 packaged by the phosphor composition of *Phellodendron* extract according to the present invention. Shown in FIG. 4, the LED device 40 is packaged as follows: a blue light emitting diode (LED) chip 400 is arranged on a substrate 401 and mounted onto the substrate 401 by wire bonding. Next, fluorescent glue 402 that covers the blue LED chip 400 and conductive wires 403 is formed on the substrate 401 by dispensing. Next, a lens 404 is arranged onto the fluorescent glue 402 that includes the *Phellodendron* extract of the present invention and yellow phosphor. Accordingly, the phosphor composition of the *Phellodendron* extract and the yellow phosphor in the fluorescent glue 402 is excited by the blue lights with wavelength from 455 nm to 457.5 nm emitted from the blue LED chip 400 to emit warm white light with wavelength from 400 nm to 800 nm for the LED device 40.

Besides, for embodiments of the present invention, red phosphor or green phosphor may be added into the fluorescent glue 402 for chroma control. Material of the yellow phosphor may be selected from the group consisted of $Y_3Al_5O_{12}:Ce^{3+}$(YAG), $Tb_3Al_5O_{12}:Ce^{3+}$(TAG) and $(Mg, Ca, Sr, Ba)_2SiO_4:Eu^{2+}$. Material of the red phosphor may be selected from the group consisted of $(Sr, Ca)S:Eu^{2+}$, $(Y, La, Gd, Lu)_2O_3:Eu^{3+}$, $Bi^{3+}$; $(Y, La, Gd, Lu)_2O_2S:Eu^{3+}$, $Bi^{3+}$; $(Ca, Sr, Ba)_2Si_5N_8:Eu^{2+}$, $(Ca,Sr)AlSiN_3:Eu^{2+}$, $Sr_3SiO_5:Eu^{2+}$, $Ba_3MgSi_2O_8:Eu^{2+}$, $Mn^{2+}$ and $ZnCdS:Ag^{1+}$, $Cl^{1-}$. Material of green phosphor may be selected from the group consisted of $BaMgAl_{10}O_{17}:Eu^{2+}$, $Mn^{2+}$(BAM-Mn), $SrGa_2S_4:Eu^{2+}$, $Lu_3Al_5O_{12}:Ce^{3+}$(LuAG), $(Ca,Sr,Ba)Al_2O_4:Eu^{2+}$, $SrSi_2N_2O_2:Eu^{2+}$, $CaSc_2O_4:Ce^{3+}$, $Ca_3Sc_2Si_3O_{12}:Ce^{3+}$, $(Ca,Sr,Ba)_4Al_{14}O_{25}:Eu^{2+}$, $Ca_8Mg(SiO_4)_4Cl_2:Eu^{2+}$, $Mn^{2+}$ and $(Ba, Sr)_2SiO_4:Eu^{2+}$.

Though only a known LED device with a known package is illustrated in the present invention, however, the phosphor composition of the *Phellodendron* extract of the present invention may apply to various LED packages, not limited to the one aforementioned.

Figure 5:
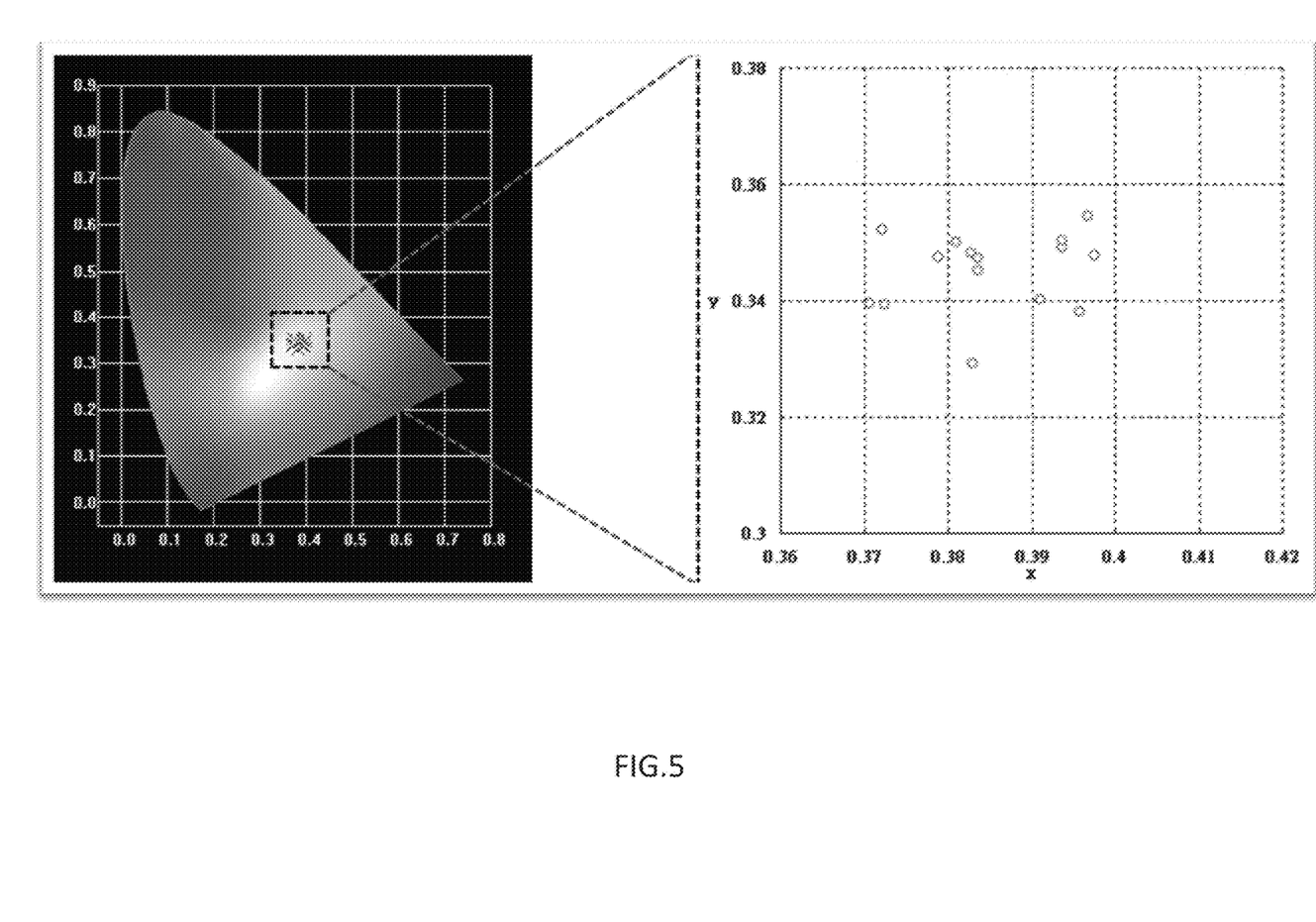
FIG. 5 is a chromaticity diagram illustrating a package LED including the phosphor composition with various ratios of *Phellodendron* extracts according to the present invention.
Figure 6:
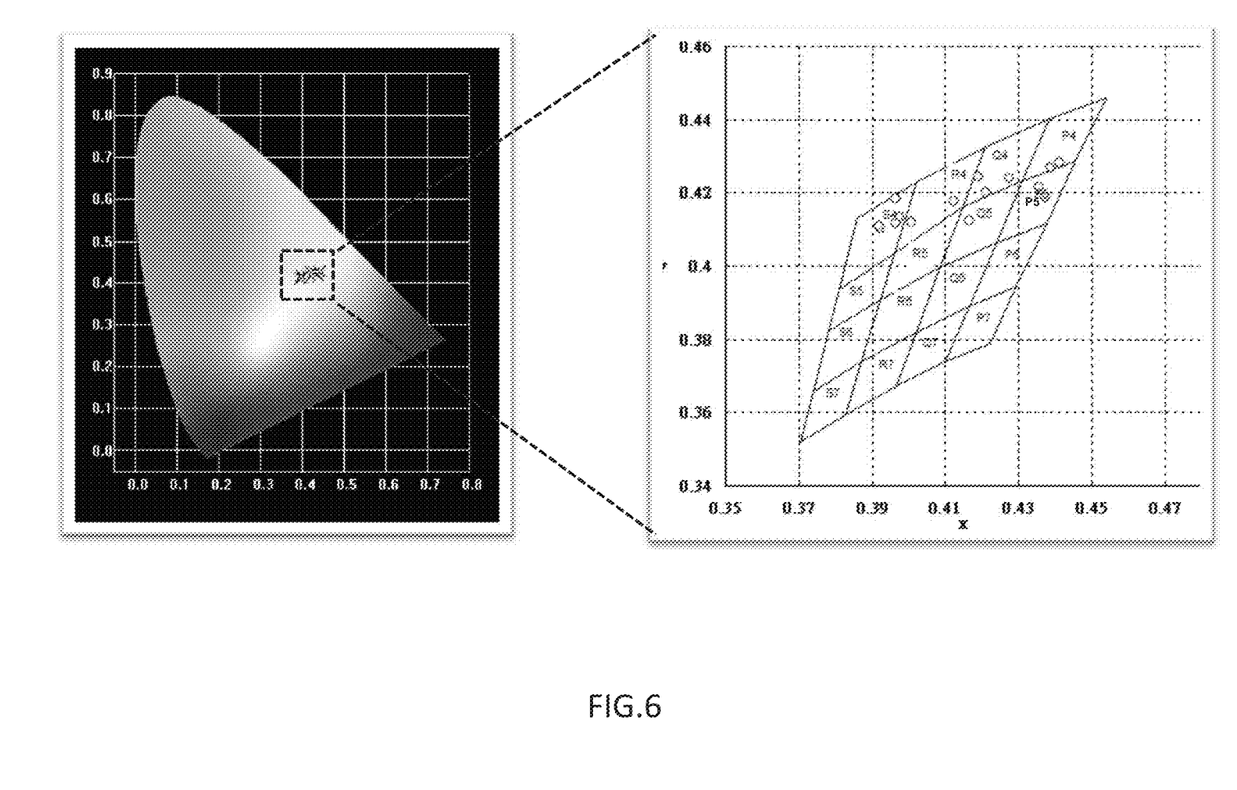
FIG. 6 is a chromaticity diagram illustrating a package LED including the phosphor composition with various ratios of *Phellodendron* extract according to the present invention.
Figure 7:
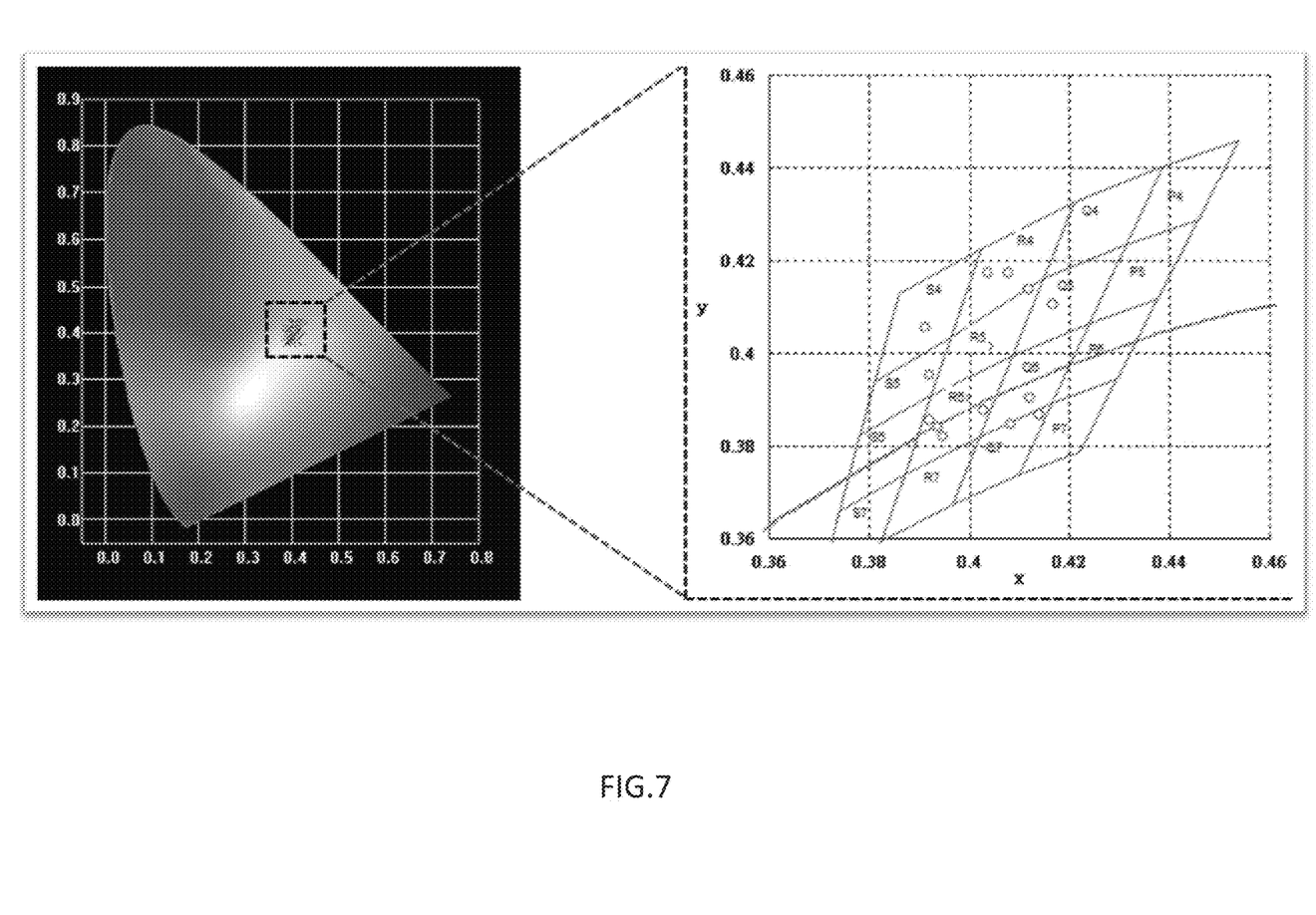
FIG. 7 is a chromaticity diagram illustrating a package LED including the phosphor composition with various ratios of *Phellodendron* extract according to the present invention.
Figure 8:
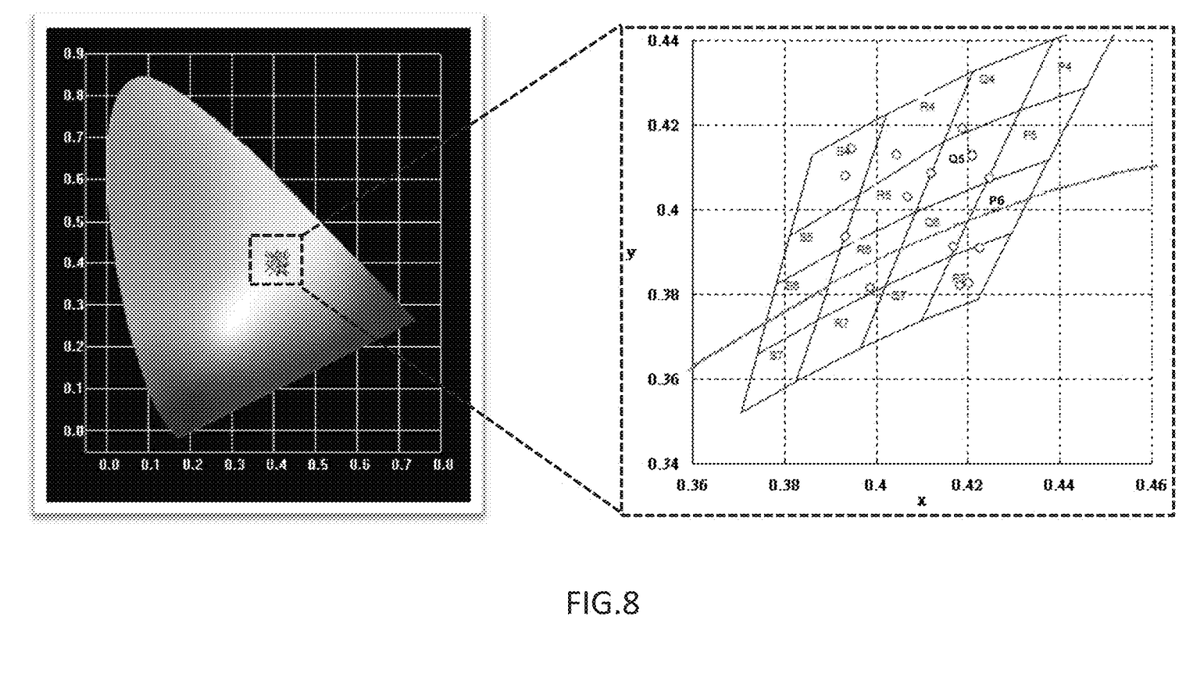
FIG. 8 is a chromaticity diagram illustrating a package LED including the phosphor composition with commercial yellow phosphor and red phosphor according to the present invention.

FIG. 5, FIG. 6 and FIG. 7 are Commission International de l'Eclairage (CIE) diagrams of LED packages with the phosphor composition of the *Phellodendron* extract in various ratios, and FIG. 8 is the one of control group having LED package of yellow phosphor and red phosphor.

Shown in FIG. 5, the phosphor composition with such a CIE diagram includes: the yellow phosphor of 0.06 grams and the *Phellodendron* extract of 0.015 grams (weight ratio is 4:1). Package test data of FIG. 5 is shown in Table 1.1: (Num is number of testing package; x and y are chromaticity coordinates; Lv is brightness; Vf is forward voltage; CCT is color temperature; CRI is color rendering index; IR is reverse current; Max is maximum value; Avg is average value; and Min is minimum value.)

TABLE 1.1

| Num | x | y | Lv | Vf | CCT | CRI | Ir |
|---|---|---|---|---|---|---|---|
| 1 | 0.3836 | 0.3472 | 14.3624 | 3.085 | 3686.8891 | 72.8629 | 0.1088 |
| 2 | 0.3836 | 0.3452 | 15.6251 | 3.0453 | 3668.2375 | 73.2911 | 0.102 |
| 3 | 0.3958 | 0.3382 | 13.6458 | 3.0859 | 3256.336 | 74.2915 | 0.1086 |
| 4 | 0.3827 | 0.3482 | 14.7417 | 3.0454 | 3722.0864 | 72.9483 | 0.1192 |
| 5 | 0.3829 | 0.3292 | 12.8831 | 3.0527 | 3526.4769 | 74.2811 | 0.1176 |
| 6 | 0.381 | 0.3502 | 14.7321 | 3.0494 | 3789.3236 | 73.2644 | 0.1026 |
| 7 | 0.391 | 0.3403 | 12.2726 | 3.0992 | 3409.1959 | 74.3822 | 0.1183 |
| 8 | 0.3726 | 0.3392 | 14.8946 | 3.1002 | 3953.2003 | 72.1099 | 0.1158 |
| 9 | 0.3722 | 0.3523 | 13.6346 | 3.0746 | 4071.4795 | 74.9281 | 0.1084 |
| 10 | 0.3707 | 0.3395 | 12.3711 | 3.0444 | 4018.3477 | 72.8372 | 0.1014 |

TABLE 1.1-continued

| Num | x | y | Lv | Vf | CCT | CRI | Ir |
|---|---|---|---|---|---|---|---|
| 11 | 0.3967 | 0.3546 | 15.7363 | 3.0625 | 3403.1497 | 74.0922 | 0.1178 |
| 12 | 0.3937 | 0.3492 | 14.2030 | 3.0689 | 3427.5195 | 76.2832 | 0.119 |
| 13 | 0.3788 | 0.3476 | 15.7261 | 3.1025 | 3831.8569 | 74.9190 | 0.1175 |
| 14 | 0.3976 | 0.3477 | 14.182 | 3.0726 | 3311.2913 | 72.1987 | 0.1196 |
| 15 | 0.3937 | 0.3503 | 12.3111 | 3.0615 | 3438.3929 | 72.0102 | 0.1097 |
| Max | 0.3976 | 0.3546 | 15.7363 | 3.1025 | 4071.4795 | 76.2832 | 0.1196 |
| Avg | 0.3851 | 0.3453 | 14.0881 | 3.0700 | 3634.2522 | 73.6467 | 0.1124 |
| Min | 0.3707 | 0.3292 | 12.2726 | 3.0444 | 3256.336 | 72.0102 | 0.1014 |

Shown in FIG. 6, the phosphor composition with such a CIE diagram includes: the yellow phosphor of 0.08 grams and the *Phellodendron* extract of 0.01 grams (weight ratio is 8:1). Package test data of FIG. 6 is shown in Table 1.2:

TABLE 1.2

| Num | x | y | Lv | Vf | CCT | CRI | Ir |
|---|---|---|---|---|---|---|---|
| 1 | 0.4388 | 0.4267 | 4.904 | 2.8692 | 3158.253 | 70.0242 | 0.1098 |
| 2 | 0.4122 | 0.4177 | 5.721 | 2.8702 | 3567.195 | 71.3984 | 0.1283 |
| 3 | 0.4211 | 0.42 | 5.482 | 2.8722 | 3415.324 | 72.1948 | 0.1034 |
| 4 | 0.3922 | 0.4102 | 6.211 | 2.8711 | 3935.165 | 70.2112 | 0.1298 |
| 5 | 0.3966 | 0.4185 | 5.764 | 2.8719 | 3888.813 | 72.8311 | 0.3011 |
| 6 | 0.4373 | 0.4187 | 5.632 | 2.8674 | 3124.25 | 71.9282 | 0.1092 |
| 7 | 0.4275 | 0.4241 | 6.372 | 2.8723 | 3329.652 | 70.2839 | 0.1088 |
| 8 | 0.419 | 0.4244 | 5.836 | 2.8796 | 3483.811 | 72.1184 | 0.1029 |
| 9 | 0.3919 | 0.4108 | 6.338 | 2.8719 | 3945.409 | 70.1983 | 0.0915 |
| 10 | 0.4008 | 0.4119 | 5.962 | 2.8765 | 3759.507 | 71.2711 | 0.1387 |
| 11 | 0.3966 | 0.4116 | 6.298 | 2.8722 | 3847.2 | 70.3682 | 0.1197 |
| 12 | 0.4167 | 0.4122 | 5.387 | 2.8371 | 3442.535 | 70.1873 | 0.1223 |
| 13 | 0.4413 | 0.4281 | 5.444 | 2.8356 | 3128.218 | 70.1825 | 0.1192 |
| 14 | 0.3977 | 0.4133 | 5.873 | 2.8411 | 3834.067 | 72.3817 | 0.1182 |
| 15 | 0.4356 | 0.4215 | 6.392 | 2.8319 | 3173.083 | 72.9855 | 0.0918 |
| Max | 0.4413 | 0.4281 | 6.372 | 2.8796 | 3945.4 | 72.8311 | 0.3011 |
| Avg | 0.4136 | 0.4177 | 5.8017 | 2.8649 | 3561.4 | 71.1128 | 0.1288 |
| Min | 0.3919 | 0.4102 | 4.904 | 2.8356 | 3124.2 | 70.0242 | 0.0915 |

Shown in FIG. 7, the phosphor composition with such a CIE diagram includes: the yellow phosphor of 0.1 grams and the *Phellodendron* extract of 0.01 grams (weight ratio is 10:1). Package test data of FIG. 7 is shown in Table 1.3:

TABLE 1.3

| Num | x | y | Lv | Vf | CCT | CRI | Ir |
|---|---|---|---|---|---|---|---|
| 1 | 0.4119 | 0.3902 | 16.1649 | 3.092 | 3370.9 | 75.1883 | 0.1107 |
| 2 | 0.4036 | 0.4014 | 14.4833 | 3.0866 | 3629.6 | 73.8024 | 0.1124 |
| 3 | 0.3989 | 0.3904 | 14.9441 | 3.1058 | 3653.1 | 76.4275 | 0.0879 |
| 4 | 0.4083 | 0.3847 | 13.5631 | 3.0976 | 3401.8 | 75.5625 | 0.0959 |
| 5 | 0.3948 | 0.3821 | 15.1003 | 3.1229 | 3685.9 | 73.465 | 0.1175 |
| 6 | 0.3921 | 0.3856 | 13.9142 | 3.1016 | 3776.2 | 73.9228 | 0.0883 |
| 7 | 0.4138 | 0.3867 | 16.5929 | 3.0794 | 3303.1 | 74.3124 | 0.1016 |
| 8 | 0.4078 | 0.4173 | 16.7609 | 3.1386 | 3651.1 | 75.1052 | 0.1094 |
| 9 | 0.3935 | 0.3841 | 15.6146 | 3.1107 | 3731.8 | 73.2344 | 0.1161 |
| 10 | 0.3921 | 0.3952 | 13.1694 | 3.0859 | 3842.7 | 75.8994 | 0.1014 |
| 11 | 0.4167 | 0.4106 | 16.2008 | 3.0812 | 3431.1 | 75.9073 | 0.0888 |
| 12 | 0.3913 | 0.4056 | 13.5012 | 3.1025 | 3927.6 | 76.8594 | 0.1033 |
| 13 | 0.4027 | 0.3876 | 15.509 | 3.1099 | 3547.0 | 73.2164 | 0.1115 |
| 14 | 0.4117 | 0.4138 | 16.5689 | 3.1213 | 3550.5 | 75.5408 | 0.0986 |
| 15 | 0.4037 | 0.4173 | 16.3155 | 3.0648 | 3733.8 | 75.2346 | 0.089 |
| Max | 0.4167 | 0.4173 | 16.7609 | 3.1386 | 3927.6 | 76.8594 | 0.1175 |
| Avg | 0.4029 | 0.3968 | 15.2269 | 3.1001 | 3615.7 | 74.9119 | 0.1022 |
| Min | 0.3913 | 0.3821 | 13.1694 | 3.0648 | 3303.1 | 73.2164 | 0.0879 |

Shown in FIG. 8, a commercial phosphor composition of yellow phosphor and red phosphor with such a CIE diagram includes: the yellow phosphor of 0.1 grams and the red phosphor of 0.00475 grams. Package test data of FIG. 8 is shown in Table 1.4:

TABLE 1.4

| Num | x | y | Lv | Vf | CCT | CRI | Ir |
|---|---|---|---|---|---|---|---|
| 1 | 0.4207 | 0.4134 | 17.1853 | 3.1026 | 3375.9 | 75.2355 | 0.1317 |
| 2 | 0.4189 | 0.419 | 16.6273 | 3.0903 | 3448.9 | 73.345 | 0.0954 |
| 3 | 0.4119 | 0.4084 | 19.455 | 3.1185 | 3508.8 | 78.6778 | 0.0688 |
| 4 | 0.4182 | 0.3821 | 20.3318 | 3.1147 | 3174.7 | 75.5782 | 0.1235 |
| 5 | 0.3933 | 0.3935 | 17.4936 | 3.0868 | 3803.4 | 78.4704 | 0.1135 |
| 6 | 0.4211 | 0.4127 | 15.219 | 3.1106 | 3363.4 | 75.9279 | 0.1164 |
| 7 | 0.4249 | 0.4075 | 20.7841 | 3.0816 | 3254.7 | 73.9641 | 0.1049 |
| 8 | 0.4069 | 0.4029 | 20.5891 | 3.0724 | 3571.0 | 73.7909 | 0.0752 |
| 9 | 0.4226 | 0.391 | 18.2292 | 3.1001 | 3165.3 | 78.2689 | 0.0717 |
| 10 | 0.417 | 0.3912 | 16.1234 | 3.1154 | 3275.9 | 73.4401 | 0.0794 |
| 11 | 0.4045 | 0.413 | 16.4876 | 3.0617 | 3689.7 | 78.2971 | 0.1284 |
| 12 | 0.3988 | 0.3815 | 15.7927 | 3.1194 | 3587.5 | 74.6027 | 0.0803 |
| 13 | 0.3946 | 0.4144 | 17.7012 | 3.0859 | 3907.5 | 73.9042 | 0.1174 |
| 14 | 0.4202 | 0.3827 | 17.4893 | 3.0965 | 3140.4 | 78.7245 | 0.127 |
| 15 | 0.3933 | 0.408 | 17.7934 | 3.1135 | 3897.4 | 74.5846 | 0.1153 |
| Max | 0.4249 | 0.419 | 20.7841 | 3.1194 | 3907.5 | 78.7245 | 0.1317 |
| Avg | 0.4111 | 0.4014 | 17.8201 | 3.0980 | 3477.6 | 75.7875 | 0.1033 |
| Min | 0.3933 | 0.3815 | 15.219 | 3.0617 | 3140.4 | 73.345 | 0.0688 |

Accordingly, square marks shown on FIG. 5, FIG. 6 and FIG. 7, the phosphor compositions of the *Phellodendron* extract in various ratios of the present invention may emit warm white lights similar to the commercial one of yellow phosphor and red phosphor shown in FIG. 8.

Figure 9:
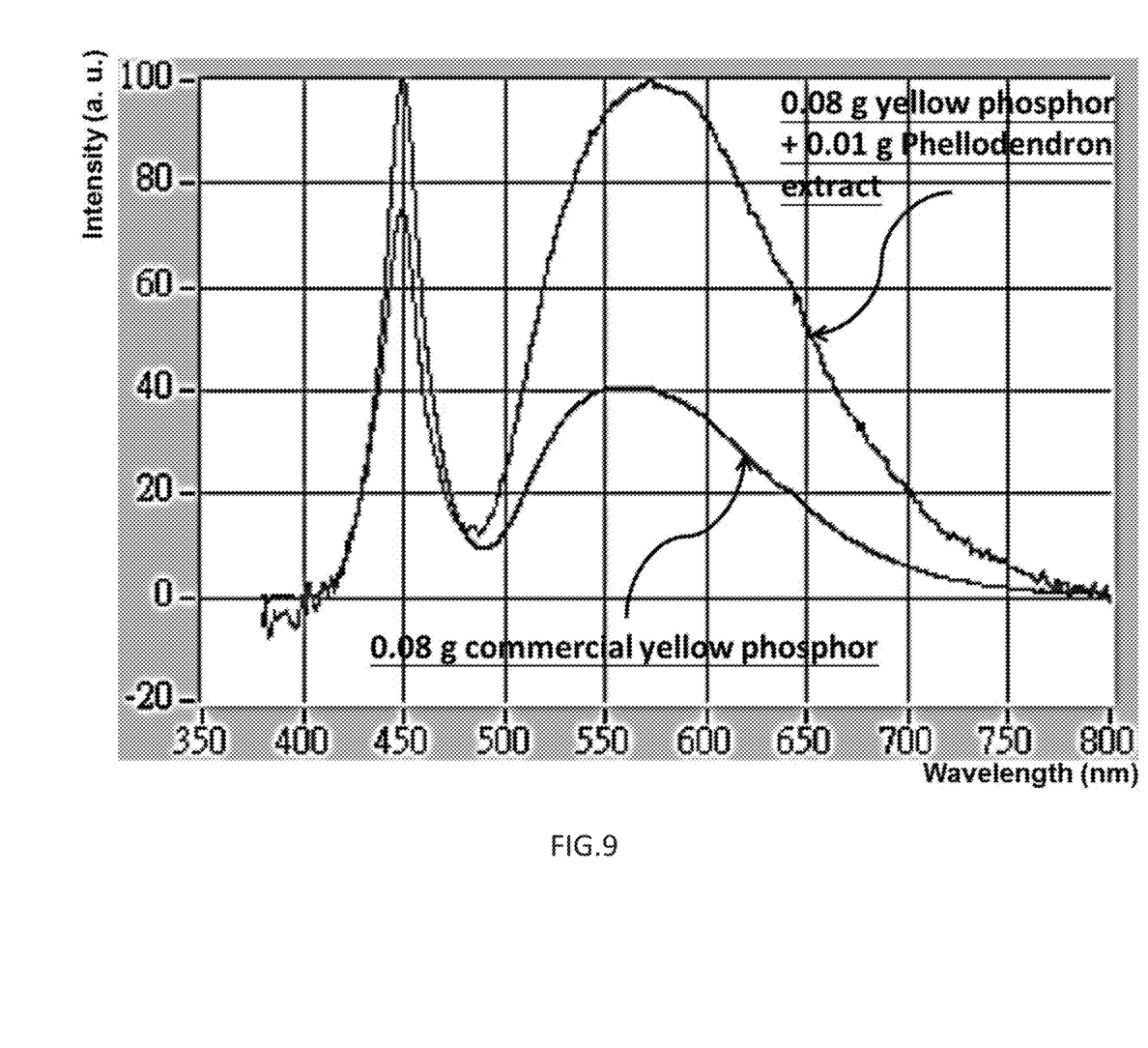
FIG. 9 is a diagram illustrating relative strength of wavelength of the phosphor composition including commercial yellow phosphor and *Phellodendron* extract according to the present invention.

FIG. 9 is a diagram illustrating relative strengths of wavelengths of the phosphor compositions including commercial yellow phosphor and *Phellodendron* extract, respectively, according to the present invention. Shown in FIG. 9, the packages respectively including commercial yellow phosphor of 0.08 grams and the phosphor composition of the

*Phellodendron* extract (including 0.08 grams yellow phosphor and 0.01 grams *Phellodendron* extract) are tested. It is shown that the relative strength (%) of the phosphor composition including 0.01 grams *Phellodendron* extract is higher than the ones of the commercial yellow phosphor without *Phellodendron* extract. Accordingly, compared with the commercial yellow phosphor without *Phellodendron* extract, the phosphor composition including *Phellodendron* extract performs better color rendering index.

Compared with prior technologies, the present invention provides the phosphor composition that is easy to be prepared and may emit warm white light similar to the ones from LED device in markets. The phosphor composition of the present invention reduces much manufacturing cost of LED device because of its easy preparation and low consumption. Consequently, it is a worthy composition in fields.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A phosphor composition, comprising:
   a first phosphor; and
   a second phosphor including a *Phellodendron* extract.

2. The phosphor composition according to claim 1, wherein a weight ratio of the first phosphor and the second phosphor is between 4:1 and 32:1.

3. The phosphor composition according to claim 2, wherein the weight ratio of the first phosphor and the second phosphor is 10:1.

4. The phosphor composition according to claim 1, wherein the phosphor composition emits lights with wavelength from 400 nm to 800 nm.

5. The phosphor composition according to claim 1, wherein the *Phellodendron* extract is excited by lights with wavelength from 300 nm to 480 nm.

6. The phosphor composition according to claim 1, wherein the *Phellodendron* extract emits lights with wavelength from 450 nm to 750 nm.

7. The phosphor composition according to claim 1, wherein the first phosphor is selected from the group consisting of a yellow phosphor, a red phosphor, and a green phosphor.

8. The phosphor composition according to claim 7, wherein the yellow phosphor is selected from the group consisting of $Y_3Al_5O_{12}:Ce^{3+}$(YAG), $Tb_3Al_5O_{12}:Ce^{3+}$(TAG), and $(Mg, Ca, Sr, Ba)_2SiO_4:Eu^{2+}$.

9. The phosphor composition according to claim 7, wherein the red phosphor is selected from the group consisting of $(Sr, Ca)S:Eu^{2+}$, $(Y, La, Gd, Lu)_2O_3:Eu^{3+}, Bi^{3+}$; $(Y, La, Gd, Lu)_2O_2S:Eu^{3+}, Bi^{3+}$; $(Ca, Sr, Ba)_2Si_5N_8:Eu^{2+}$, $(Ca, Sr)AlSiN_3:Eu^{2+}$, $Sr_3SiO_5:Eu^{2+}$, $Ba_3MgSi_2O_8:Eu^{2+}, Mn^{2+}$ and $ZnCdS:Ag^{1+}, Cl^{1-}$.

10. The phosphor composition according to claim 7, wherein the green phosphor is selected from the group consisting of $BaMgAl_{10}O_{17}:Eu^{2+}, Mn^{2+}$(BAM-Mn), $SrGa_2S_4:Eu^{2+}$, $Lu_3Al_5O_{12}:Ce^{3+}$(LuAG), $(Ca, Sr, Ba)Al_2O_4:Eu^{2+}$, $SrSi_2N_2O_2:Eu^{2+}$, $CaSc_2O_4:Ce^{3+}$, $Ca_3Sc_2Si_3O_{12}:Ce^{3+}$, $(Ca, Sr, Ba)_4Al_{14}O_{25}:Eu^{2+}$, $Ca_8Mg(SiO_4)_4Cl_2:Eu^{2+}, Mn^{2+}$, and $(Ba, Sr)_2SiO_4:Eu^{2+}$.

11. A light emitting diode device including the phosphor composition of claim 1.

\* \* \* \* \*